July 24, 1951  O. A. GRANOWSKI  2,561,858

LIQUID DRIVEN MOTOR

Filed Nov. 21, 1947  2 Sheets-Sheet 1

INVENTOR.
OSCAR ADOLPH GRANOWSKI
BY Hazeltine, Lake & Co.
AGENTS

July 24, 1951  O. A. GRANOWSKI  2,561,858
LIQUID DRIVEN MOTOR

Filed Nov. 21, 1947 2 Sheets-Sheet 2

INVENTOR.
OSCAR ADOLPH GRANOWSKI
BY Haseltine Lake & Co.
AGENTS

Patented July 24, 1951

2,561,858

UNITED STATES PATENT OFFICE 2,561,858

LIQUID DRIVEN MOTOR

Oscar Adolf Granowski, Kooyong, Victoria, Australia, assignor of one-half to Louise Wilhelmina Granowski, Kooyong, Victoria, Australia Application November 21, 1947, Serial No. 787,315
In Australia April 2, 1946

Section 1, Public Law 690, August 8, 1946
Patent expires April 2, 1966

4 Claims. (Cl. 121—99)

This invention relates to liquid driven motors and refers especially to a motor driven by water from household water mains which is capable of imparting reciprocating angular motion to the impeller, clothes receptacle or other clothes agitating device of a domestic washing machine.

An object of this invention is to provide a motor of the abovementioned type which will effectively perform the work required of it, which is compact in shape and size, which is particularly economical to manufacture, and which is reliable and durable in use.

Another object is to provide a liquid driven motor which can be mounted on the fixed central vertical shaft of a washing machine and which can be readily coupled to the clothes receptacle or impeller of the machine so as to effect an oscillating motion of said receptacle or impeller for the washing operation.

According to the invention, a liquid driven motor comprises a fixed shaft, a fixed casing mounted concentrically on the shaft, a cylindrical rotor chamber in the casing, a rotor rotatably mounted on the shaft and within the rotor chamber and capable of oscillating motion in said rotor chamber, at least two radial walls in the rotor chamber extending between the rotor and the periphery of the rotor chamber and dividing said rotor chamber into at least two segmental chambers, at least two radial vanes on the rotor and spaced equidistantly from each other, one of said vanes being located in each segmental chamber and being capable of limited oscillating motion therein, each radial vane dividing the segmental chamber in which it is located into a first compartment and a second compartment, a valve body secured to the casing at one end of the rotor chamber, a valve chamber in the valve body, a valve slidable in the valve chamber, a longitudinal inlet passage in the shaft through which liquid under pressure is supplied to the motor, an outlet passage for the discharge of liquid from the motor, an inlet port in the valve chamber communicating with the inlet passage, an outlet port in the valve chamber communicating with the outlet passage, intermediate ports in the valve chamber, a first arcuate channel in the valve body communicating between one intermediate port and the first compartments, a second arcuate channel in the valve body communicating between the other intermediate port and the second compartments, channels in the valve which alternately place the intermediate ports in communication with the inlet and outlet ports as the valve reciprocates in the valve chamber, end ports in the valve chamber adjacent the ends thereof, valve operating ports in the end of the rotor chamber which communicate with the said end ports, a valve member on one of the radial vanes, which valve member is in sliding contact with the said end of the rotor chamber, supply channels in the said valve member which alternately connect the valve operating ports to the inlet passage when the rotor is in its limiting positions, and discharge passages in the valve member which alternately connect the valve operating ports to the outlet passage, each valve operating port being connected to supply when the other is connected to discharge.

A feature of the invention resides in the provision of at least two radial vanes on the rotor, the said vanes being spaced equidistantly from each other around the rotor, whereby the rotational thrust applied to the rotor is distributed uniformly therearound.

A further feature consists in providing a valve face on one of the radial vanes or on a flange thereof, which valve face slidably engages a valve face on the end of the rotor chamber, passages being formed in said vane or flange which cooperate with passages in the valve body so that the said vane constitutes a valve which controls the admission of liquid to and discharge of liquid from the valve chamber to operate the slide valve.

Other objects and features of the invention will be apparent from the ensuing description of the preferred form of the invention illustrated in the accompanying drawings, and wherein.

Figure 1:
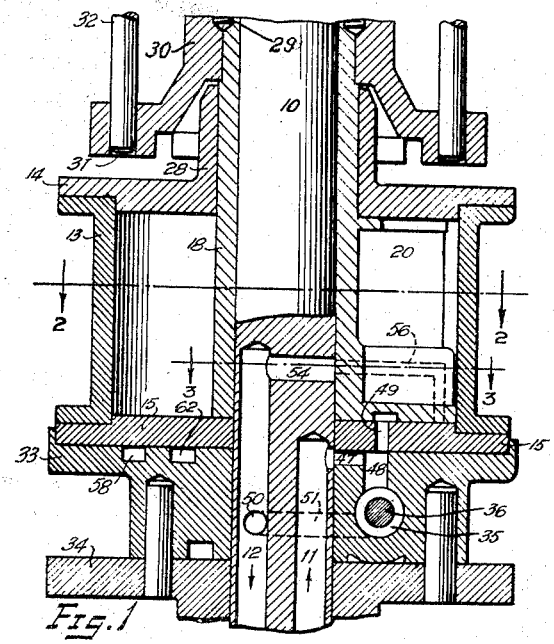
Figure 1 is a view in sectional elevation of a water driven motor for a washing machine.
Figure 3:
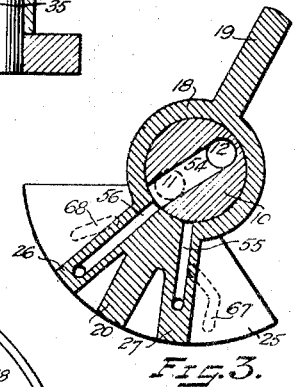
Figure 3 is a view in sectional plan taken on the line 3—3 of Figure 1.

Referring to the drawings, wherein the same reference numerals are employed to indicate like or corresponding parts, the reference numeral 10 indicates the vertical shaft of a washing machine. The shaft 10 is fixed centrally in the machine and is provided with a longitudinal inlet passage 11 through which water under pressure is supplied to the motor, and with a longitudinal outlet passage 12 through which the water is withdrawn.

A cylindrical fixed casing 13 surrounds the shaft and an upper coverplate 14 and a valve plate or lower coverplate 15 are bolted or otherwise secured to its upper and lower ends. Diametrically opposite radial walls 16, 17 are formed integrally with the casing 13 and divide the interior thereof into segmental chambers of semi-circular cross-section. A transverse slot 15' is provided in the upper surface of the plate 15 which fits over the lower ends of the walls 16, 17.

A rotor 18 fits rotatably on the shaft 10 and rests at its lower end on the valve plate 15. Radial vanes 19 and 20 are provided on the rotor 18 on opposite sides thereof. The vane 19 divides the chamber in which it is located into compartments 21, 22, and the vane 20 divides the opposite chamber into compartments 23, 24. The lower end of the vane 20 is formed integrally with a plate 25 of segmental shape which is provided with upstanding flanges 26, 27 on either side of the vane 20 for the purpose hereinafter described. Thus the rotor is capable of oscillating movement which is limited by the end faces of the plate 25 engaging the walls 16, 17.

The upper end of the rotor 18 is rotatable in a boss 28 formed integrally with the coverplate 14, and is secured by screws 29 to a coupling member 30. Holes 31 are provided in the coupling member 30 into which pins 32 are lowered when it is desired to couple the motor to the clothes receptacle, impeller or other unit (not shown) of the machine.

A valve body 33 is secured to the underside of the valve plate 15 and is mounted on and secured to a bottom plate 34. A cylindrical valve chamber 35 is formed in the valve body 33, and a slide valve 36 fits slidably in the valve chamber 35 and is capable of a small longitudinal movement therein. The valve 36 comprises four equally spaced ring portions 37 separated by sections 38 of reduced diameter, annular spaces 39 being thereby formed between the sections 38 and the wall of the valve chamber. The ends 40 of the valve 36 are tapered so as to provide a space between the valve 36 and the end of the valve chamber 35 when the valve is in contact with said end.

Ports 41, 42 are provided at the ends of the valve chamber 35 which connect with curved channels 43, 44 respectively formed in the upper surface of the valve body 33. The inner ends of the channels 43, 44 communicate with valve operating ports 45, 46 respectively formed in the valve plate 15.

The inlet passage 11 in the shaft communicates through a horizontal port 47 in the body 35 with a port 48 leading downwardly to the interior of the valve chamber 35, and with a vertical supply port 49 in the valve plate 15.

The outlet passage 12 in the shaft communicates through inclined passages 50 in the shaft with right-angled passages 51 in the body 33 which connect with outlet ports 52, 53 in the wall of the valve chamber 35. The outlet passage 12 is also connected at its upper end through a passage 54 in the shaft 10 with either of two right-angled discharge passages 55, 56 formed in the flanges 27, 26 respectively. The lower ends of the passages 55, 56 are adapted to connect alternately with the valve operating ports 46, 45 respectively.

A port 57 is provided in the valve plate 15 adjacent to the wall 16 which communicates at its upper end with the compartment 21 and at its lower end with an arcuate channel 58 formed in the upper surface of the body 33. The channel 58 communicates adjacent to its other end with a port 59 in the valve plate 15 which communicates with the compartment 24. A passage 60 in the body 33 connects the end of the channel 58 with an intermediate port 61 in the wall of the valve chamber.

A second arcuate channel 62 in the body 33 connects ports 63 and 64 in the valve plate 15, the port 63 communicating with the compartment 23 and the port 64 with the compartment 22. A passage 65 connects the end of the channel 62 with an intermediate port 66 in the wall of the valve chamber 35.

Supply channels 67 and 68 are formed in the undersurface of the plate 25, these channels being positioned so as to place the inlet port 49 alternately in communication with the valve operating ports 45, 46 which connect with opposite ends of the valve chamber 35.

Figure 4:
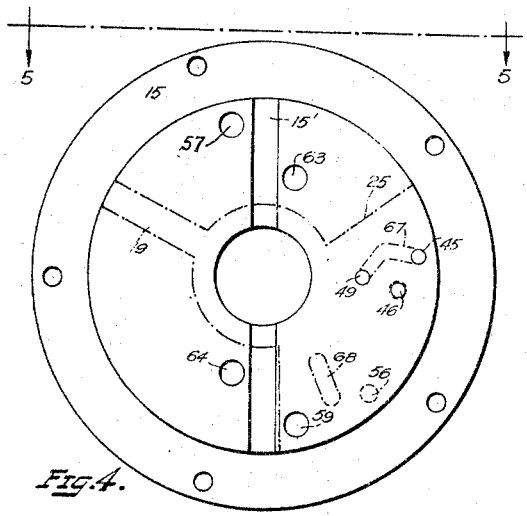
Figure 4 is a view in plan of the plate which closes the lower end of the rotor chamber.
Figure 5:
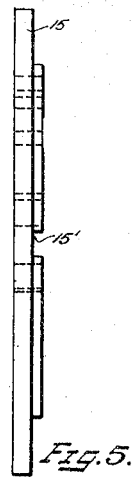
Figure 5 is a view in elevation taken on the line 5—5 of Figure 4.

In operation water under pressure is supplied to the motor through the inlet passage 11 in the shaft 10. The water passes inwardly through the ports 47 and 48 to the valve chamber 35. If it is assumed that the rotor 18 is in the position shown in Figure 4 the supply channel 67 connects the port 49 with the valve operating port 45 and the port 45 communicates through the channel 43 with the port 41 at one end of the valve chamber 35. Thus water under pressure is supplied to this end of the valve chamber and forces the valve 36 towards the other end of the valve chamber 35. At the same time the space at the opposite end of the valve chamber from the port 41 communicates through the port 42, curved channel 44, valve operating port 46, discharge passage 55 and passage 54 to the outlet passage 12 so that water in the opposite end of the valve chamber is allowed to pass to discharge as the valve 36 is moved towards that end of the valve chamber.

Figure 2:
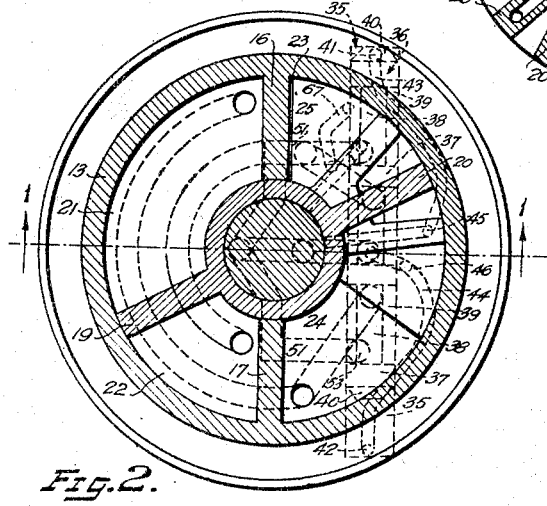
Figure 2 is a view in sectional plan taken on the line 2—2 of Figure 1.
Figure 7:
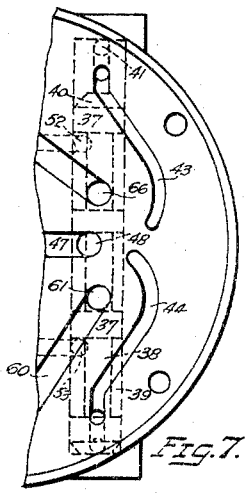
Figure 7 is a fragmentary plan view of the body shown in Figure 4, the valve being shown in the opposite position.

When the valve reaches the position shown in Figure 7 the inlet port 48 is placed in communication with the intermediate port 61 by means of the passage 39 between the valve and the wall of the valve chamber and water under pressure is thus admitted to the channels 60 and 58 and is admitted through the port 57 to the compartment 21 of the rotor chamber and through the port 59 to the compartment 24 of the rotor chamber. This forces the vane 19 of the rotor 18 away from the wall 16 and towards the wall 17, and it forces the vane 20 away from the wall 17 and towards the wall 16. The rotor therefore moves from the position shown in Figure 4 to the position shown in Figure 2.

During this movement of the rotor part of the water contained in the compartment 22 passes outwardly through the port 64, arcuate channel 62, passage 65, intermediate port 66, passage 39, port 52, passage 51, and port 50 to the outlet passage 12. Part of the water contained in the compartment 23 passes outwardly through the port 63 into the passage 65 and thence by the same course to the outlet passage 12. This movement of the rotor causes the supply channel 68 to connect the inlet port 49 to the valve operating port 46 so that water under pressure is admitted through the curved channel 44 and port 42 to the end of the valve chamber with which the port 42 communicates. At the same time the movement of the rotor places the discharge passage 56 in register with the valve operating port 45 so that the water in the end of the valve chamber 35 adjacent to the port 41 is allowed to pass outwardly through the arcuate channel 43, valve operating port 45, discharge passage 56, passage 54 and outlet passage 12. Thus the valve 36 is moved from the position shown in Figure 7 to the position shown in Figure 6.

Figure 6:
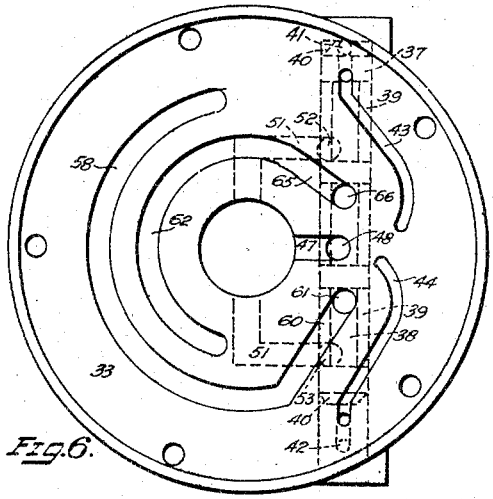
Figure 6 is a view in plan of the valve body, the valve being shown in one position.

When the valve reaches the position shown in Figure 6 the inlet port 48 is in communication with the intermediate port 66 and water under pressure is therefore admitted to the passage 65 and arcuate channel 62. This water passes through the ports 63 and 64 to the compartments 23 and 22 respectively of the rotor chamber and returns the rotor from the position shown in Figure 2 to the position shown in Figure 4. During this movement part of the water contained in the compartments 21 and 24 passes outwardly through the port 57 and channel 58 and through the port 59 and channel 60 to the intermediate port 61 whence it passes through the channel 39, port 53 and passage 51 to the discharge passage 12. The abovementioned cycle then recommences.

By this means oscillatory or reciprocating angular motion is imparted to the rotor 18 and to the coupling 30. The extent of the angular motion can be varied by altering the size of the segmental plate 25 and the positions of the associated parts. The speed of the motor may be varied by altering the pressure of the water and the diameter of the passages through which it passes. Where the motor is to be used for operating the agitating mechanism of a domestic washing machine the inlet and outlet passages are made of such a size as to ensure that reciprocating angular motion of suitable speed is obtained when the motor is connected to water at a pressure comparable with that of a normal household water supply.

I claim:

1. A liquid driven motor, comprising a fixed shaft, a fixed casing mounted concentrically on the shaft, a cylindrical rotor chamber in the casing, a rotor rotatably mounted on the shaft and within the rotor chamber and capable of oscillating motion in said rotor chamber, at least two radial walls in the rotor chamber extending between the rotor and the periphery of the rotor chamber and dividing said rotor chamber into at least two segmental chambers, at least two radial vanes on the rotor and spaced equidistantly from each other, one of said vanes being located in each segmental chamber and being capable of limited oscillating motion therein, each radial vane dividing the segmental chamber in which it is located into a first compartment and a second compartment, a valve body secured to the casing at one end of the rotor chamber, a valve chamber in the valve body, a valve slidable in the valve chamber, a longitudinal inlet passage in the shaft through which liquid under pressure is supplied to the motor, an outlet passage for the discharge of liquid from the motor, an inlet port in the valve chamber communicating with the inlet passage, an outlet port in the valve chamber communicating with the outlet passage, intermediate ports in the valve chamber, a first arcuate channel in the valve body communicating between one intermediate port and the first compartments, a second arcuate channel in the valve body communicating between the other intermediate port and the second compartments, channels in the valve which alternately place the intermediate ports in communication with the inlet and outlet ports as the valve reciprocates in the valve chamber, end ports in the valve chamber adjacent the ends thereof, valve operating ports in the end of the rotor chamber which communicate with the said end ports, a valve member on one of the radial vanes, which valve member is in sliding contact with the said end of the rotor chamber, supply channels in the said valve member which alternately connect the valve operating ports to the inlet passage when the rotor is in its limiting positions, and discharge passages in the valve member which alternately connect the valve operating ports to the outlet passage, each valve operating port being connected to supply when the other is connected to discharge.

2. A liquid driven motor according to claim 1 and having a valve plate disposed between the valve body and the rotor chamber, the valve operating ports and a supply port being formed in said valve plate, and channels in the valve member one of which connects the supply port to one of the valve operating ports when the rotor is in one limiting position and the other of which connects the supply port to the other valve operating port, when the rotor is in the other limiting position.

3. A liquid driven motor according to claim 1 and having a valve plate disposed between the valve body and the rotor chamber, the valve operating ports and a supply port being formed in said valve plate, channels in the valve member, one of which connects the supply port to one of the valve operating ports when the rotor is in one limiting position, and the other of which connects the supply port to the other valve operating port when the rotor is in the other limiting position, and discharge ports in the valve member which are connected by the discharge passages with the outlet passage, one discharge port being aligned with each valve operating port when the other valve operating port is connected to the supply port.

4. A liquid driven motor according to claim 1 wherein the valve member comprises a segmental plate formed on one end of a radial vane, the ends of said segmental plate alternately engaging the radial walls at the completion of each angular movement of the rotor.

OSCAR ADOLF GRANOWSKI.

REFERENCES CITED

The following references are of record in the file of this patent:

UNITED STATES PATENTS

| Number | Name | Date |
| --- | --- | --- |
| 967,560 | Rizer | Aug. 16, 1910 |
| 1,022,813 | Bauer | Apr. 9, 1912 |
| 1,059,079 | Schulz | Apr. 15, 1913 |
| 1,096,239 | Haeseler | May 12, 1914 |
| 1,160,648 | Peck | Nov. 16, 1915 |

FOREIGN PATENTS

| Number | Country | Date |
| --- | --- | --- |
| 20,702 | Austria | July 25, 1905 |